(12) United States Patent
Titus et al.

(10) Patent No.: US 11,110,975 B2
(45) Date of Patent: Sep. 7, 2021

(54) ACTIVE HOOD VENT SYSTEM AND METHOD OF ADJUSTING AERO BALANCE OF A MOTOR VEHICLE

(71) Applicant: FORD GLOBAL TECHNOLOGIES, LLC, Dearborn, MI (US)

(72) Inventors: Matthew Arthur Titus, Livonia, MI (US); Andrew Thomas Cunningham, Royal Oak, MI (US); Michael Stephen Sylvester, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/655,562

(22) Filed: Oct. 17, 2019

(65) Prior Publication Data

US 2020/0047825 A1 Feb. 13, 2020

Related U.S. Application Data

(63) Continuation of application No. 15/487,986, filed on Apr. 14, 2017, now Pat. No. 10,486,754.

(51) Int. Cl.
*B62D 37/02* (2006.01)
*B62D 25/12* (2006.01)

(52) U.S. Cl.
CPC ............ *B62D 37/02* (2013.01); *B62D 25/12* (2013.01); *B60Y 2300/022* (2013.01); *B60Y 2400/304* (2013.01); *B60Y 2400/40* (2013.01)

(58) Field of Classification Search
CPC .. B62D 37/02; B62D 25/12; B60Y 2300/022; B60Y 2400/304; B60Y 2400/40

USPC ............................................ 296/180.1–180.5
See application file for complete search history.

(56) References Cited

U.S. PATENT DOCUMENTS

| | | | |
|---|---|---|---|
| 4,850,444 A | 7/1989 | Bojanowski et al. | |
| 5,275,249 A | 1/1994 | Nelson | |
| 5,950,753 A | 9/1999 | Muldoon et al. | |
| 7,559,391 B2 | 7/2009 | Bradley et al. | |
| 8,479,853 B2 | 7/2013 | Verbrugge | |
| 8,777,299 B2 | 7/2014 | Langford, Jr. | |
| 10,166,859 B1* | 1/2019 | Del Gaizo | B60K 11/085 |
| 2014/0231161 A1 | 8/2014 | Lehti et al. | |
| 2015/0232138 A1* | 8/2015 | Parry-Williams | B62D 35/02 296/180.5 |
| 2017/0158259 A1* | 6/2017 | Fahland | B62D 37/02 |
| 2017/0158262 A1* | 6/2017 | Shami | B62D 35/005 |
| 2018/0162223 A1* | 6/2018 | Alfredson | F16H 48/20 |

(Continued)

*Primary Examiner* — Hilary L Gutman
(74) *Attorney, Agent, or Firm* — Vichit Chea; King & Schickli, PLLC

(57) ABSTRACT

An active hood vent system for a motor vehicle includes a hood vent, having a closure displaceable between a closed position and an opened position, and a control module. That control module is configured to adjust the aero balance of the motor vehicle by opening and closing the closure. Further, the control module may be configured to close the closure and thereby minimize engine compartment air from entering an HVAC inlet of the motor vehicle when the current operating temperature of the motor vehicle is below a predetermined temperature requiring engine cooling, and a current motor vehicle speed is below a predetermined speed where airflow over the hood limits ingestion of engine compartment air by the HVAC inlet.

12 Claims, 5 Drawing Sheets

(56) References Cited

U.S. PATENT DOCUMENTS

| | | | |
|---|---|---|---|
| 2018/0265142 A1* | 9/2018 | Titus | B60T 7/04 |
| 2019/0092402 A1* | 3/2019 | Fahland | B60W 30/02 |
| 2019/0092403 A1* | 3/2019 | Bray | G05B 15/02 |
| 2019/0111979 A1* | 4/2019 | Demetrio | B62D 35/005 |
| 2019/0389517 A1* | 12/2019 | Maarhuis | B62D 37/02 |

* cited by examiner

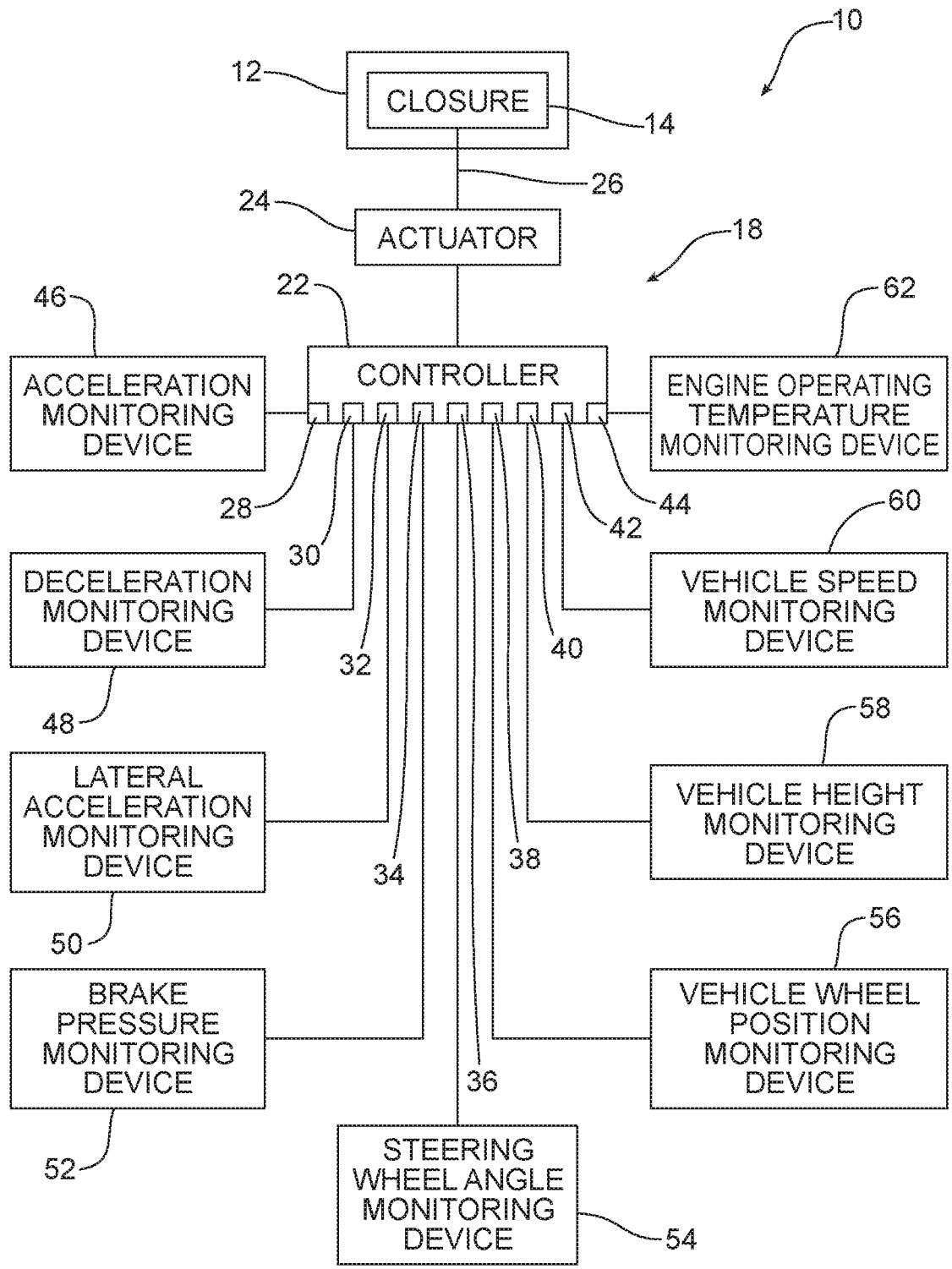

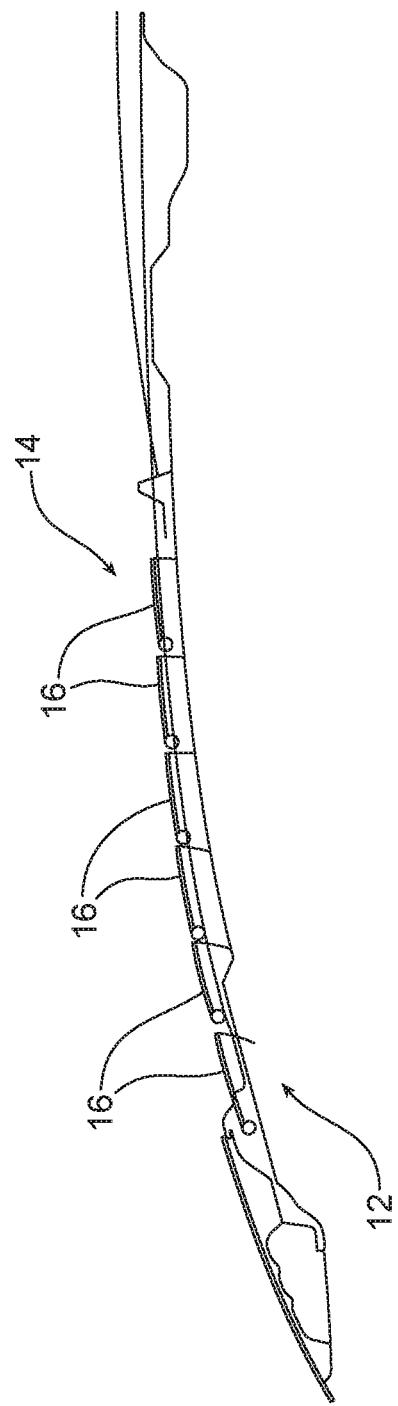

ACTIVE HOOD VENT SYSTEM AND METHOD OF ADJUSTING AERO BALANCE OF A MOTOR VEHICLE

This application is a continuation of U.S. patent application Ser. No. 15/487,986 filed on Apr. 14, 2017, entitled "Active Hood Vent System and Method of Adjusting Aero Balance of a Motor Vehicle" the full disclosure of which is incorporated herein by reference.

TECHNICAL FIELD

This document relates generally to the motor vehicle equipment field and, more particularly, to an active hood vent system as well as to a method of adjusting the aero balance of a motor vehicle by opening and closing shutters of the active hood vent system.

BACKGROUND

It is known in the art to provide a motor vehicle with an active hood vent system wherein the shutters of the active hood vent system are (a) closed to protect the under hood components of the motor vehicle from rain or other inclement weather or when the vehicle is parked and (b) opened to provide enhanced cooling to the under hood components or to reduce vehicle lift at high speeds.

This document relates to a new and improved active hood vent system including two novel operating modes. The first of those novel modes relates to adjusting the aero balance of the motor vehicle. More specifically, the shutters of the hood vent system are opened or closed to provide active tuning of the front and rear downforce balance of the motor vehicle and thereby enhance vehicle stability during various operations including, but not limited to braking, cornering and accelerating. The second of those modes relates to closing the shutters of the active hood vent system at low speeds to minimize engine compartment air from entering the heating, ventilation and air conditioning (HVAC) fresh air inlet located at the cowl aft and nearby the active hood vents. This improves the air quality of passenger cabin and the operating efficiency of the HVAC system.

SUMMARY

In accordance with the purposes and benefits described herein, a new and improved active hood vent system is provided for a motor vehicle. That active hood vent system comprises a hood vent including a closure displaceable between a closed position and an open position and a control module configured to adjust aero balance of the motor vehicle by opening and closing said closure in real time response to changing vehicle dynamics due to, for example, braking, cornering and accelerating.

The control module may include a controller and an actuator. The actuator functions to open and close the closure in response to the controller. The controller may be configured to close the closure to reduce front downforce and increase rear downforce of the motor vehicle when motor vehicle deceleration exceeds a predetermined deceleration. The controller may be configured to open the closure to increase front downforce and reduce rear downforce of the motor vehicle when the current motor vehicle cornering force exceeds a predetermined cornering force. The controller may be configured to close the closure to reduce front downforce and increase rear downforce of the motor vehicle when applied brake pressure exceeds a predetermined brake pressure.

The controller may be configured to open the closure to increase front downforce and reduce rear downforce of the motor vehicle when current steering wheel angle exceeds a predetermined steering wheel angle. The controller may be configured to open the closure to increase front downforce and reduce rear downforce of the motor vehicle when current wheel yaw position exceeds a predetermined wheel yaw position. The controller may be configured to open the closure to increase front downforce and reduce rear downforce of the motor vehicle when current motor vehicle lateral acceleration exceeds a predetermined lateral acceleration.

The controller may be configured to close the closure to reduce front downforce, increase rear downforce and reduce overall drag on the motor vehicle when a current motor vehicle speed exceeds a predetermined speed. The closure may be configured to close the closure to reduce front downforce, increase rear downforce and reduce overall drag on the motor vehicle when current motor vehicle acceleration exceeds a predetermined acceleration.

The controller may be configured to close the closure and thereby minimize engine compartment air from entering an HVAC fresh air inlet of the motor vehicle under any predetermined operating conditions. For example, the controller may be configured to close the closure when a current operating temperature of the motor vehicle is below a predetermined temperature and a current motor vehicle speed is below a predetermined speed at which airflow over the hood tends to limit ingestion of engine compartment air from the open active hood vent system at the HVAC inlet of the motor vehicle.

In accordance with an additional aspect, an active hood vent system for a motor vehicle comprises a hood vent including a closure displaceable between a closed position and an open position. The active hood vent system also includes a control module configured to close the closure and thereby minimize engine compartment air from entering an HVAC inlet of the motor vehicle. Toward this end the controller may be configured to close the closure when a current operating temperature of the motor vehicle is below a predetermined temperature and a current motor vehicle speed is below a predetermined speed at which the airstream moving over the hood tends to limit ingestion of engine compartment air exhausted from the hood vent into the HVAC inlet of the motor vehicle.

In accordance with yet another aspect, a method is provided of adjusting the aero balance of a motor vehicle where that motor vehicle includes an active hood vent with a closure displaceable between an open position and a closed position. That method comprises the steps of opening the closure to increase front downforce and reduce rear downforce of the motor vehicle and closing the closure to reduce front downforce and increase rear downforce of the motor vehicle.

The method may include closing the closure when decelerating above a predetermined deceleration rate. The method may include the step of opening the closure when cornering above a predetermined cornering force. The method may include closing the closure when accelerating above a predetermined acceleration rate. The method may include closing the closure when driving above a predetermined speed.

In addition, the method may include the step of monitoring, by at least one monitoring device, a parameter selected from a group of parameters consisting of vehicle acceleration, vehicle deceleration, vehicle lateral acceleration, vehicle cornering force, brake pressure, steering wheel angle, vehicle wheel yaw position, vehicle height, vehicle speed, engine operating temperature and combinations thereof.

In the following description, there are shown and described several preferred embodiments of the active hood vent system as well as the related method of adjusting aero balance of a motor vehicle by means of that active hood vent system. As it should be realized, the active hood vent system and related method are capable of other, different embodiments and their several details are capable of modification in various, obvious aspects all without departing from the active hood vent system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the active hood vent system as well as the related method of adjusting the aero balance of a motor vehicle by means of the active hood vent system and together with the description serve to explain certain principles thereof. In the drawing figures:

FIG. 1 is a schematic block diagram of the active hood vent system.

FIG. 2a is a schematic side elevational view of a hood vent of the active hood vent system with the closure thereof in a closed position.

Reference will now be made in detail to the present preferred embodiments of the active hood vent system and the related method of controlling aero balance, examples of which are illustrated in the accompanying drawing figures.

DETAILED DESCRIPTION

Figure 2B:
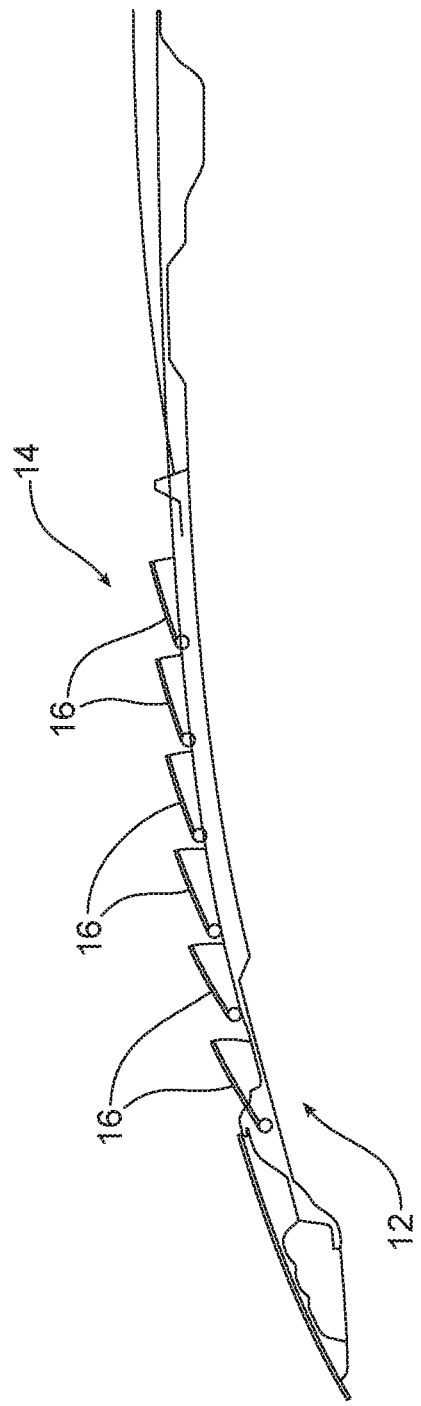
FIG. 2b is a view similar to FIG. 2a but illustrating the closure of the hood vent in a fully opened position.
Figure 3:
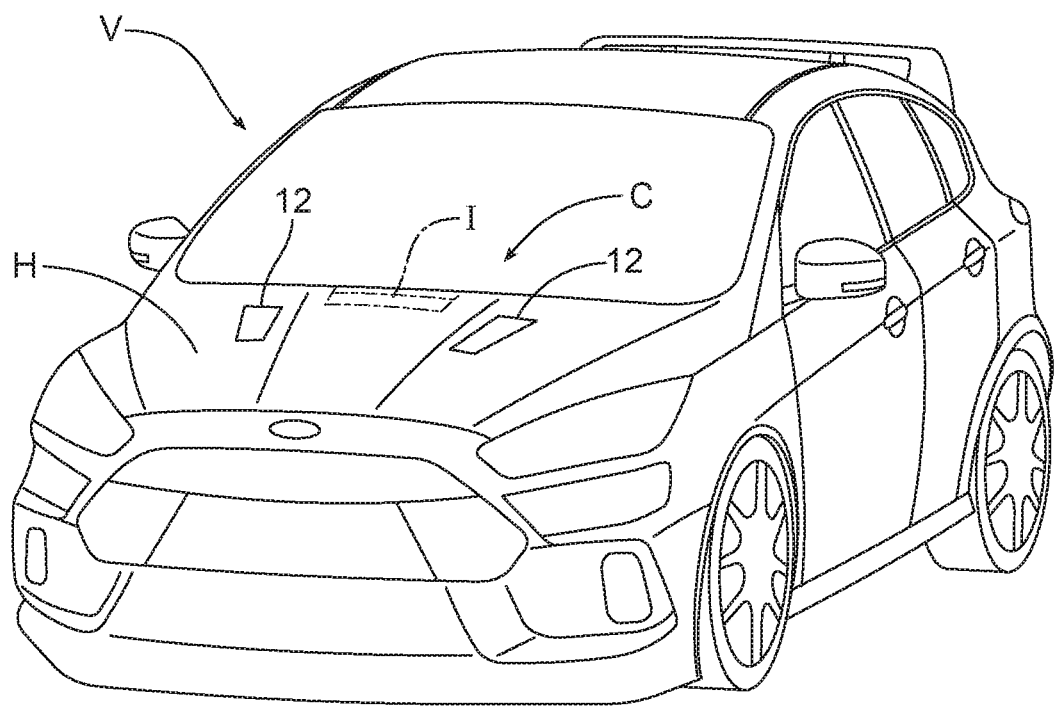
FIG. 3 is a front perspective view of a motor vehicle incorporating the active hood vent system.

Reference is now made to FIGS. 1-3 which, taken together, fully illustrate the new and improved active hood vent system 10. That active hood vent system 10 provides a first operating mode which provides for aero balance adjustment and a second operating mode which minimizes introduction of engine compartment air into the HVAC air inlet of the motor vehicle equipped with the active hood vent system. As shown in FIG. 1, the active hood vent system 10 includes a hood vent 12 including a closure 14. That closure 14 is displaceable between a closed position, such as illustrated in FIG. 2a, and an opened position such as illustrated in FIG. 2b. In some embodiments, the closure 14 is infinitely adjustable between the opened position and the closed position to better allow for fine aero balance tuning of the motor vehicle equipped with the active hood vent system 10. As illustrated in FIGS. 2a and 2b, the closure 14 may comprise a plurality of shutters 16. Here it should be noted that other closure structures could be utilized.

The active hood vent system 10 also includes a control module 18 that is configured to adjust the aero balance of the motor vehicle V equipped with the active hood vent system 10. As illustrated in FIG. 1, the control module 18 includes a controller 22 and an actuator 24. The actuator 24 functions to open and close the closure 14 in response to the controller 22. As illustrated in FIG. 3, the motor vehicle V includes two hood vents 12 on the hood H of the motor vehicle. As will become apparent from the following description, the aero balance of the motor vehicle V is adjusted by opening and closing the closure 14 of each hood vent 12.

The controller 22 may comprise a computing device such as a dedicated microprocessor or an electronic control unit (ECU) operating in accordance with instructions from appropriate control software. Accordingly, the controller 22 may comprise one or more processors, one or more memories and one or more network interfaces all in communication with each other over a communication bus. The actuator 24 may assume substantially any form appropriate for the purpose of displacing the closure 14 between the closed and opened positions. Thus, it should be appreciated that the actuator 24 may comprise an engine vacuum actuator, an electrical actuator, a solenoid, a pneumatic actuator and a hydraulic actuator. Any appropriate linkage 26 of a type known in the art may be used to connect the actuator 24 to the closure 14.

More specifically, the controller 22 may be configured to close the closure 14 to reduce front downforce and increase rear downforce of the motor vehicle V when the motor vehicle deceleration exceeds a predetermined deceleration. In addition, the controller 22 may be configured to open the closure 14 to increase front downforce and reduce rear downforce of the motor vehicle V when the current motor vehicle cornering force exceeds a predetermined cornering force. Still further, the controller 22 may be configured to close the closure 14 to reduce front downforce and increase rear downforce of the motor vehicle V when applied brake pressure exceeds a predetermined brake pressure.

The controller 22 may also be configured to open the closure 14 to increase front downforce and reduce rear downforce of the motor vehicle V when current steering wheel angle exceeds a predetermined steering wheel angle. In addition, the controller 22 may be configured to open the closure to increase front downforce and reduce rear downforce of the motor vehicle V when current wheel yaw position exceeds a predetermined wheel yaw position to the left or right of center. The controller 22 may also be configured to open the closure 14 to increase front downforce and reduce rear downforce of the motor vehicle V when current motor vehicle lateral acceleration exceeds a predetermined lateral acceleration.

The controller 22 may also be configured to close the closure 14 to reduce front downforce and increase rear downforce of the motor vehicle V when a current motor vehicle speed exceeds a predetermined speed. Further, the controller 22 may be configured to close the closure 14 to reduce front downforce and increase rear downforce of the motor vehicle V when current motor vehicle acceleration exceeds a predetermined acceleration. By increasing or reducing the front downforce and the rear downforce of the motor vehicle it is possible to dynamically adjust the overall aero balance of the motor vehicle to optimize motor vehicle performance as well as driver comfort and confidence in response to substantially any foreseeable operating conditions.

Toward this end, the controller 22 may be configured to include a plurality of data inputs 28, 30, 32, 34, 36, 38, 40, 42 and 44. Those data inputs 28, 30, 32, 34, 36, 38, 40, 42, 44 are connected to various devices 46, 48, 50, 52, 54, 56, 58, 60, 62 for monitoring various operating parameters of the motor vehicle V.

In the illustrated embodiment, the first data input 28 is connected to an acceleration monitoring device 46. The second data input 30 is connected to a deceleration monitoring device 48. The third data input 32 is connected to a lateral acceleration monitoring device 50. The fourth data input 34 is connected to a brake pressure monitoring device 52. The fifth data input 36 is connected to a steering wheel angle monitoring device 54. The sixth data input 38 is connected to a vehicle wheel yaw position monitoring device 56. The seventh data input 40 is connected to a vehicle height monitoring device 58. The eighth data input 42 is connected to a vehicle speed monitoring device 60. The ninth data input 44 is connected to an engine operating temperature monitoring device 62. Each of the monitoring devices 46, 48, 50, 52, 54, 56, 58, 60, 62 are of a type known in the art to be useful for their intended purpose and may comprise, for example, accelerometers, portentiometers, pressure sensors, position sensors, temperature sensors or other known devices.

As illustrated in FIG. 3, a heating, ventilation and air conditioning (HVAC) fresh air inlet I is provided at the cowl C of the motor vehicle V near but aft of the hood vents 12. The controller 22 is configured to close the closure 14 and thereby minimize engine compartment air from entering the downstream HVAC fresh air inlet I of the motor vehicle V when certain operating parameters are met. For example, the controller 22 may be configured to close the closure 14 when a current operating temperature of the motor vehicle V, as indicated at the ninth data input 44 by the engine operating temperature monitoring device 60 is below a predetermined temperature and a current motor vehicle speed, as indicated by the data received at the eighth data input 42 from the vehicle speed monitoring device 60, is below a predetermined speed at which air passing over the hood H prevents significant ingestion of engine compartment air passing upwardly through the hood vent 12 into the HVAC fresh air inlet I. Advantageously this serves to improve the operating efficiency of the HVAC system and particularly the air conditioner on hot summer days. It also improves the quality of the air being drawn into the HVAC system.

Consistent with the above description, a method is provided of adjusting the aero balance of a motor vehicle V wherein that motor vehicle V includes an active hood vent system 10 with a closure 14 displaceable between a closed position as illustrated in FIG. 2a and an opened position as illustrated in FIG. 2b. That method may be broadly described as comprising the steps of opening the closure 14 to increase the front downforce and reduce the rear downforce of the motor vehicle V and closing the closure to reduce the front downforce and increase rear downforce of the motor vehicle in response to changing vehicle dynamics as the motor vehicle is accelerating, decelerating, cornering and braking. Thus, the method includes the step of closing the closure 14 by means of operation of a control module 18 when the motor vehicle is decelerating above a predetermined deceleration rate as indicated by data received at the second data input 30 from the deceleration monitoring device 48.

The method may include the step of opening the closure 14 by operation of the control module 18 when cornering above a predetermined cornering force as indicated by data received at the third data input 32 from the lateral acceleration monitoring device 50.

The method may include the step of closing the closure 14, by operation of the control module 18 when accelerating above a predetermined acceleration rate as indicated by data received at the first data input 28 from the acceleration monitoring device 46. This reduces vehicle drag and enhances motor vehicle acceleration.

The method may also include the step of closing the closure 14, by operation of the control module 18, when driving above a predetermined speed as indicated by data received at the eighth data input 42 from the vehicle speed monitoring device 60. Again, this reduces drag and improves high speed performance of the motor vehicle. It also improves fuel efficiency at high speeds.

The method may also include the step of closing the closure 14, by operation of the control module 18, so as to reduce the front downforce and increase the rear downforce of the motor vehicle V when applied brake pressure exceeds a predetermined brake pressure as indicated by data received at the fourth data input 34 from the brake pressure monitoring device 52. Under braking, the motor vehicle pitches forward, shifting weight to the front tires and adding downforce from the induced pitch angle. Closing the hood vent closure 14 reduces front down force and increases read downforce, counteracting the pitch of the motor vehicle, reducing pitch sensitivity and allowing more normal force to be acting upon the rear wheels. This allows the rear brakes to be more effective.

The method may also include the step of opening the closure 14, by operation of the control module 18, to increase the front downforce and reduce rear downforce of the motor vehicle V when the current steering wheel angle exceeds a predetermined steering wheel angle as indicated by data received at the fifth data input 36 from the steering wheel angle monitoring device 54.

The method may also include the step of opening the closure 14, by operation of the control module 18, in order to increase the front downforce and reduce rear downforce of the motor vehicle V when the current wheel yaw position exceeds a predetermined wheel yaw position as indicated by data received at the sixth data input 38 from the wheel yaw position monitoring device 56.

Still further, the method may also include the step of opening the closure 14, to increase front downforce and reduce rear downforce of the motor vehicle V when the vehicle height exceeds a predetermined vehicle height as indicated by data received at the seventh data input 40 from the brake pressure monitoring device 58. In this example the vehicle height being monitored is the vehicle height at the front end of the motor vehicle.

In the above description it should be appreciated that the method may also include the step of monitoring, by at least one monitoring device 46, 48, 50, 52, 54, 56, 58, 60, 62, a parameter selected from a group consisting of vehicle acceleration, vehicle deceleration, vehicle lateral acceleration, vehicle cornering force, brake pressure, steering wheel angle, vehicle wheel yaw position, vehicle height, vehicle speed, engine operating temperature and combinations thereof.

Figure 4:
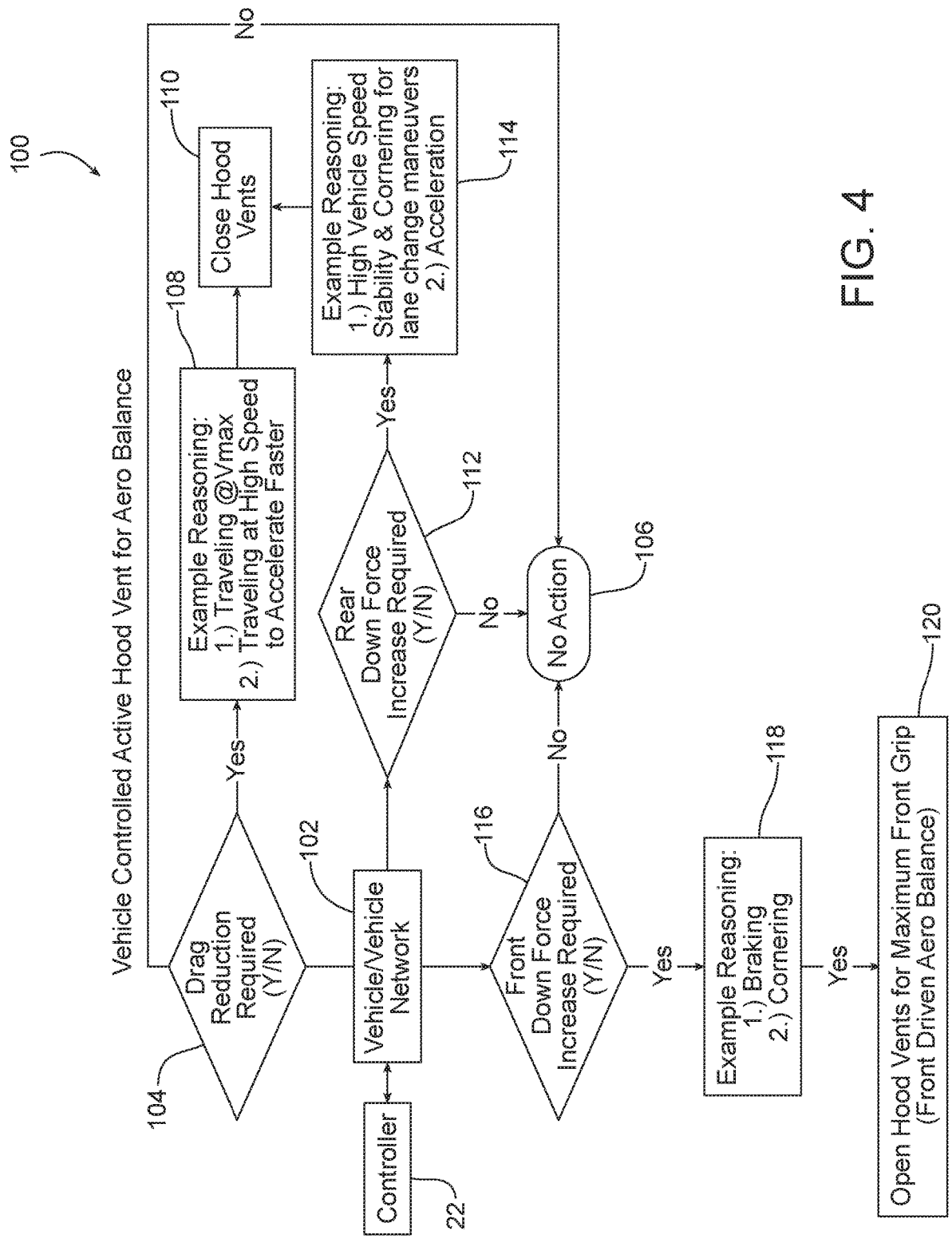
FIG. 4 is a control logic flow diagram for utilizing the active hood vent system to control the aero balance of the motor vehicle.

Reference is now made to FIG. 4 which illustrates one possible control logic flow diagram 100 for the active hood vent system 10. The controller 22 of the active hood vent control module 18 communicates with the various monitoring devices 46, 48, 50, 52, 54, 56, 58, 60, 62 through the computer area network (CAN) illustrated at block 102.

In the illustrated embodiment, the controller 22 of the control module 18 queries if drag reduction is required at block 104. If no drag reduction is required, no action is taken at block 106. In contrast, if drag reduction is required to improve vehicle stability or performance while traveling, for example, at maximum speed or to increase acceleration as illustrated at block 108 the control module 18 closes the closure 14 of the hood vent 12 at block 110.

The controller 22 of the control module 18 queries whether rear downforce increase is required at block 112. If rear downforce increase is required, for example, to improve high vehicle speed stability in cornering for lane change maneuvers or for maximum acceleration as indicated at block 114, then the control module 18 closes the closure 14 of the hood vent 12 at block 110. In contrast, if rear downforce increase is not required at block 112, no action is again taken at block 106.

The controller 22 of the control module 18 queries whether front downforce increase is required at block 116. If no front downforce increase is required, no action is taken at block 106. In contrast, if front downforce increase is required, for example, to provide improved stability during braking and cornering as indicated at block 118, then the control module 18 opens the closure 14 of the hood vent 12 for maximum front grip so as to provide front driven aero balance and enhanced stability as illustrated at block 120.

The foregoing has been presented for purposes of illustration and description. It is not intended to be exhaustive or to limit the embodiments to the precise form disclosed. Obvious modifications and variations are possible in light of the above teachings. For example, the illustrated embodiment includes a controller 22 with nine data inputs 28, 30, 32, 34, 36, 38, 40, 42, 44 for receiving data from nine monitoring devices 46, 48, 50, 52, 54, 56, 58, 60, 62. It should be appreciated that as few as two and as many as 10 or more may be used to provide data to the controller 22 depending upon the control logic of the controller. In addition, the illustrated embodiment includes separate devices 46, 48 for monitoring acceleration and deceleration of the motor vehicle V. In some embodiments, one device will serve both purposes. All such modifications and variations are within the scope of the appended claims when interpreted in accordance with the breadth to which they are fairly, legally and equitably entitled.

What is claimed:

1. An active hood vent system for a motor vehicle, comprising:
   a hood vent including a closure displaceable between a closed position and an opened position; and
   a control module configured to (a) adjust aero balance of said motor vehicle by opening and closing said closure and (b) close said closure to reduce front downforce and increase rear downforce of said motor vehicle when applied brake pressure exceeds a predetermined brake pressure.

2. The active hood vent system of claim 1, wherein said control module includes a controller and an actuator, said actuator opening and closing said closure in response to said controller.

3. The active hood vent system of claim 2, wherein said controller is configured to close said closure to reduce front downforce and increase rear downforce of said motor vehicle when motor vehicle deceleration exceeds a predetermined deceleration.

4. The active hood vent system of claim 2, wherein said controller is configured to open said closure to increase front downforce and reduce rear downforce of said motor vehicle when current motor vehicle cornering force exceeds a predetermined cornering force.

5. The active hood vent system of claim 2, wherein said controller is configured to open said closure to increase front downforce and reduce rear downforce of said motor vehicle when current steering wheel angle exceeds a predetermined steering wheel angle.

6. The active hood vent system of claim 2, wherein said controller is configured to open said closure to increase front downforce and reduce rear downforce of said motor vehicle when current wheel yaw position exceeds a predetermined wheel yaw position.

7. The active hood vent system of claim 2, wherein said controller is configured to open said closure to increase front downforce and reduce rear downforce of said motor vehicle when current motor vehicle lateral acceleration exceeds a predetermined lateral acceleration.

8. The active hood vent system of claim 2, wherein said controller is configured to close the closure to reduce front downforce and increase rear downforce of the motor vehicle when a current motor vehicle speed exceeds a predetermined speed.

9. The active hood vent system of claim 2, wherein said controller is configured to close the closure to reduce front downforce and increase rear downforce of the motor vehicle when current motor vehicle acceleration exceeds a predetermined acceleration.

10. The active hood vent system of claim 2, wherein said controller is configured to close said closure and thereby minimize engine compartment air from entering an HVAC fresh air inlet of said motor vehicle.

11. The active hood vent system of claim 2, wherein said controller is configured to close said closure when a current operating temperature of said motor vehicle is below a predetermined temperature and a current motor vehicle speed is below a predetermined speed.

12. An active hood vent system for a motor vehicle, comprising:
    a hood vent including a closure displaceable between a closed position and an opened position; and
    a control module configured to (a) adjust aero balance of said motor vehicle by opening and closing said closure and (b) open said closure to increase front downforce and reduce rear downforce of said motor vehicle when current steering wheel angle exceeds a predetermined steering wheel angle.

\* \* \* \* \*